Jan. 20, 1959     H. E. STOVER     2,869,300
MACHINE FOR ASEPTICALLY SEALING CONTAINERS
Filed Nov. 5, 1954     5 Sheets-Sheet 1
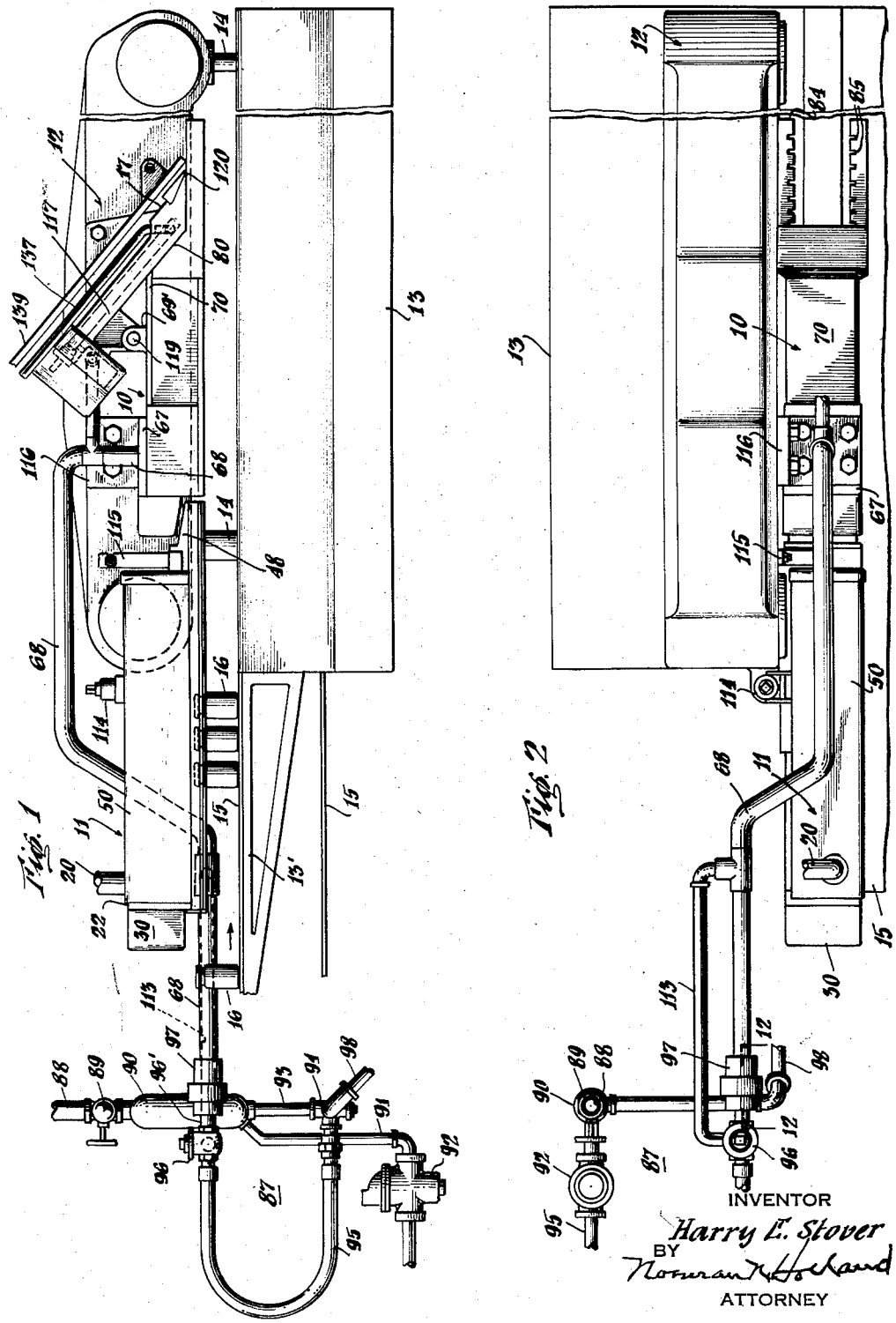
INVENTOR
*Harry E. Stover*
BY
*Norman K. Holland*
ATTORNEY

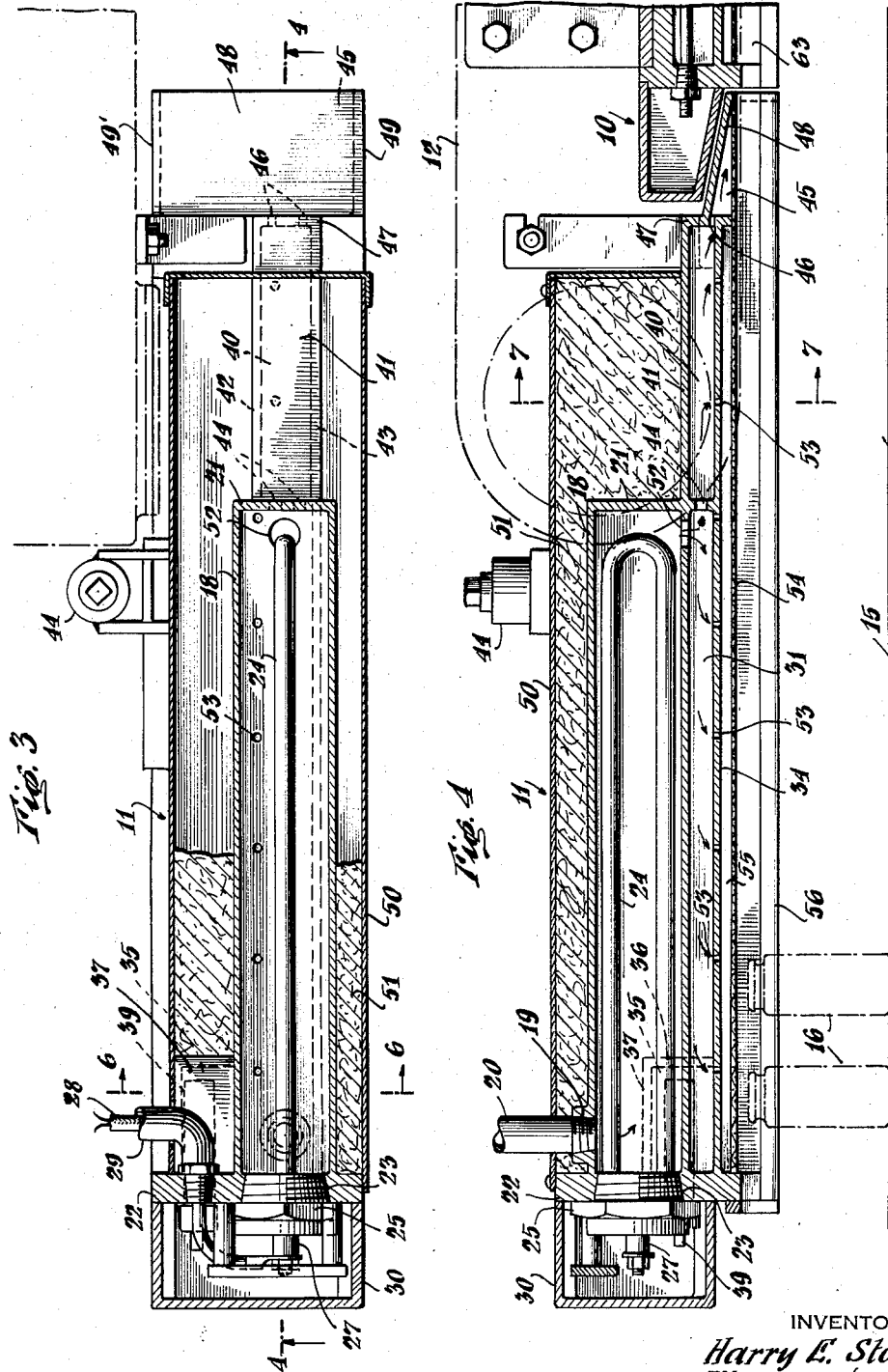

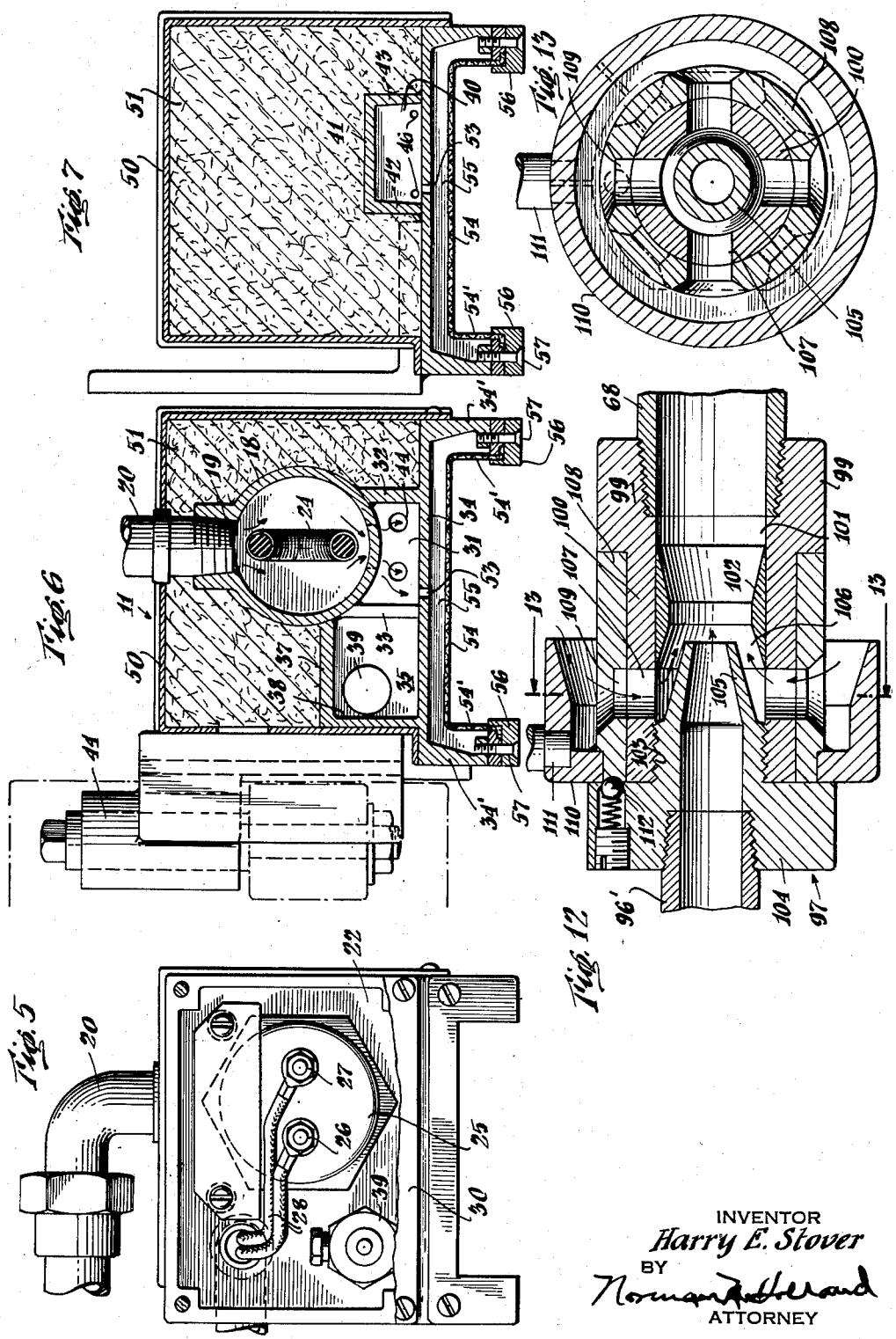

Jan. 20, 1959 H. E. STOVER 2,869,300
MACHINE FOR ASEPTICALLY SEALING CONTAINERS
Filed Nov. 5, 1954 5 Sheets-Sheet 4
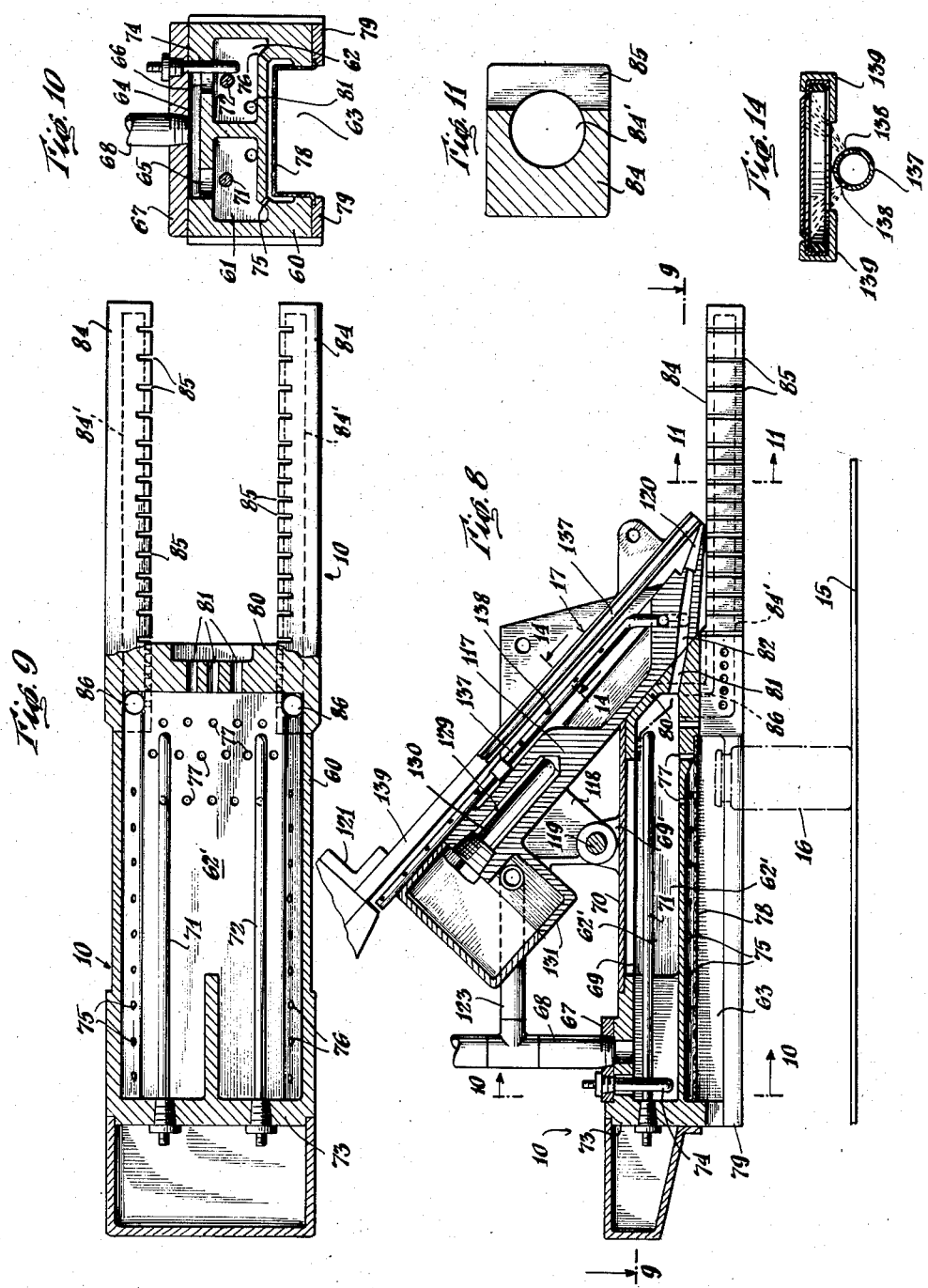
INVENTOR
*Harry E. Stover*
BY
*Norman A. Holland*
ATTORNEY

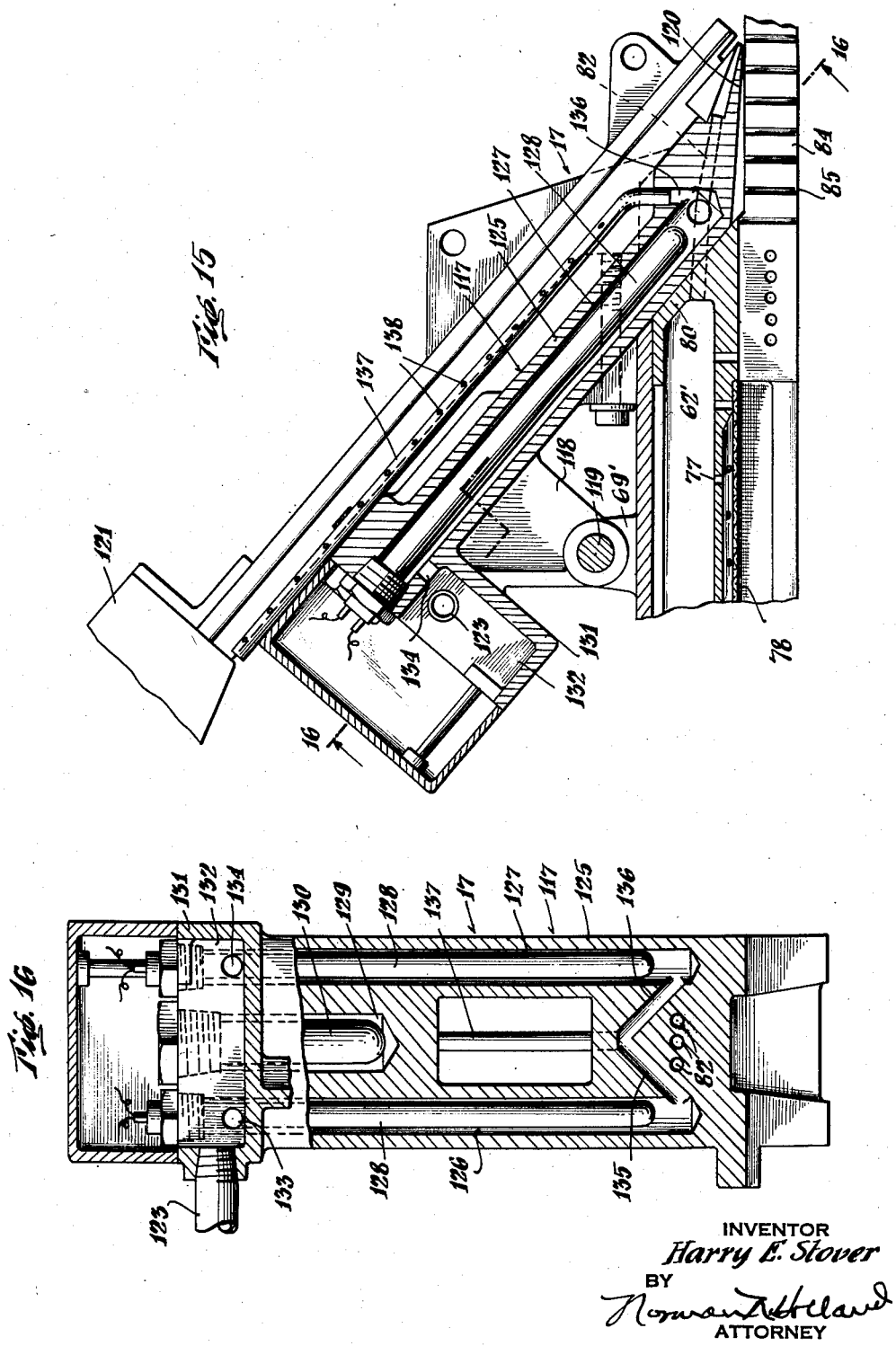

United States Patent Office 2,869,300
Patented Jan. 20, 1959

2,869,300

MACHINE FOR ASEPTICALLY SEALING CONTAINERS

Harry E. Stover, Lancaster, Ohio, assignor to Anchor Hocking Glass Corporation, Lancaster, Ohio, a corporation of Delaware Application November 5, 1954, Serial No. 467,081

15 Claims. (Cl. 53—88)

This invention relates to the sealing art and is an improvement upon my prior application, S. N. 397,223, filed in the United States Patent Office on December 9, 1953. The present invention relates to a method and machine for aseptic sealing of products sealed at temperatures adapted to afford the best taste, quality and appearance of the product and to give a longer shelf-life without requiring sterilization after the container is sealed.

The present practice in preparing and sealing products which are sold to the consumers in glass jars and in metal cans is first to cook the product. The product is then placed in the containers hot, preferably as near the boiling temperature as possible. Thereafter the package is sealed either with or without a vacuum but generally with a vacuum. The sealed containers are placed in baskets and then the baskets are placed in retorts where the product within the sealed containers is sterilized. The sterilizing operation necessitates heating the product considerably above the boiling temperature and maintaining the heat thereon until the product becomes sterilized This additional application of heat not only adds to the cooking period but it also adds to the period in a non-uniform way because the product near the outside of the container heats up first and is cooked much more than the part at the center of the container. At the end of the sterilization the product within is sterile, meaning that the microbes and spores have been killed. Such packages so long as they remain hermetically sealed will keep for a long period. However, the sterilization impairs the appearance, color and taste of the product.

Due to the objections to sterilization and the increased cost resulting from the additional operation, efforts have been made to avoid sterilizing products such as jams and jellies which have a high sugar content and hence are easier to preserve. In order to obtain a reasonably long shelf-life without sterilization subsequent to sealing packers attempt to fill the containers and seal them with the product at a temperature as near boiling as possible. Such high temperatures with jellies and jams tend to discolor the product, to cause so-called floatation and to otherwise impair the product. Most packers prefer to pack jellies and jams at temperatures not exceeding 180° F. and some of them desire lower temperatures. With these relatively low temperatures better taste, color and quality can be obtained. When these low temperatures are used there is a tendency for mold to form on the surface of the product in a relatively short period and hence the purchaser gets a spoiled product which damages the reputation of the packer and causes complaints and trouble. To avoid this, many packers sterilize after the sealing operation in spite of the added cost and of the deterioration and discoloration which result.

Another disadvantage is that packers seal their containers in vapor sealing machines. When the vapor condenses in the head space, a high vacuum is formed. With products such as jellies and jams a high vacuum is undesirable because it causes bubbles within the product and floatation. The present invention permits the use of vapor in sealing and at the same time accurately controls the amount of vacuum to that degree most desirable for optimum results.

Where containers do not have to be sterilized after the sealing operation, they may be labeled immediately after sealing, which is a substantial saving and convenience to the packer.

Accordingly, this invention has as one of its objects the provision of an improved sealing machine of the character referred to above, that avoids the disadvantages of prior machines but at the same time enables the same high rates of production attainable with prior machines. Through the utilization of aseptic sealing in accordance with this invention, steam requirements for sterilization are materially reduced and sealed containers can be immediately labeled and packaged without the necessity for intervening cooling processes or sterilization of the sealed containers in retorts.

Another object of the invention is the provision of a sealing machine wherein the steam tunnel is so arranged and designed as to enable the utilization of a wide range of steam temperatures while maintaining high sealing speeds. This is attained in part through the utilization of a composite tunnel structure wherein the steam temperatures can be varied and adjusted to attain desired ends. In addition means external of the composite head are provided for attaining the desired admixture of air and steam which results in substantial conservation of steam and at the same time effects an accurate control of the vacuum within the container.

A further object of the invention concerns a new and improved device for sterilizing the closure caps immediately prior to their application to the containers and effecting this sterilization in a manner that will not impair the subsequent hermetic sealing operation.

Still another object of the invention is a new and improved machine for packaging fruits and other foods that effects complete sterilization of the head space and cap and at the same time produces a more uniform, attractive and naturally colored product.

Still another object of the invention resides in an improved procedure for aseptically sealing containers for food and other products.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side elevational view of a sealing machine illustrating a preferred embodiment of the invention;

Fig. 2 is a plan view of the embodiment of the invention illustrated in Fig. 1;

Fig. 3 is a cross-sectional view of one section of the heating tunnel shown in Figs. 1 and 2;

Fig. 4 is a cross-sectional view of Fig. 3 taken along the line 4—4 thereof;

Fig. 5 is an elevational view of the outer end of the steam tunnel shown in Figs. 3 and 4;

Fig. 6 is a cross-sectional view of Fig. 3 taken along the lines 6—6 thereof;

Fig. 7 is a cross-sectional view of Fig. 4 taken along the lines 7—7 thereof;

Fig. 8 is a cross-sectional view of another section of the steam tunnel shown in Figs. 1 and 2;

Fig. 9 is a cross-sectional view of Fig. 8 taken along the line 9—9 thereof;

Figs. 10 and 11 are cross-sectional views taken along the lines 10—10 and 11—11, respectively, of Fig. 8;

Fig. 12 is a cross-sectional view of the venturi mixer taken along the lines 12—12 of Fig. 2;

Fig. 13 is a cross-sectional view of Fig. 12 taken along the lines 13—13 thereof;

Fig. 14 is a cross-sectional view of Fig. 8 taken along the line 14—14 thereof;

Fig. 15 is an enlarged cross-sectional view of the cap feeding mechanism shown in Fig. 8; and Fig. 16 is a cross-sectional view of Fig. 15 taken along the line 16—16 thereof.

In sealing and sterilizing containers for packaging food and other products, the containers are usually transported by means of a belt, feed screw or other similar means 13' through a steam tunnel for pre-heating the head space or unfilled portion of the container and then carrying the container to a closure applying station for sealing the cover or closure to the container.

Referring now to the drawings and more specifically to Figs. 1 and 2, the preferred embodiment of this invention embodies a composite steam tunnel that may be formed of two or more sections. In the illustrated form two sections are shown and generally denoted by the numerals 10 and 11. The steam tunnel is preferably carried by the superstructure 12 which in turn is carried by the base 13 of the machine. In normal practice the superstructure 12 is preferably supported by two or more columns 14 so that it can be raised and lowered relative to the base 13 and thus raise and lower the steam tunnels 10 and 11 to accommodate containers of different sizes. The containers are transported through the steam tunnels 10 and 11 by means of a belt 15 or other suitable transporting apparatus. If desired means for positively engaging the jars as they move through the steam tunnels and capping mechanism may be employed. The utilization of a steam tunnel composed of sections 10 and 11 not only provides additional time in which each jar or container 16 (shown in Fig. 4) is exposed to steam but also enables the attainment of more accurate and precise control of the steam and air temperatures throughout the entire travel of the containers to insure complete aseptic sealing without adversely affecting the product. In addition the vacuum within each sealed container can be carefully controlled without affecting the required degree of sterilization of the closure and head space needed to prevent deterioration of the packaged product.

As may be observed in Figs. 1 and 2 the steam tunnels 10 and 11 are joined one to the other so as to provide a substantially continuous tunnel that prevents any possible contamination of the container head space once it has entered the front end of the tunnel 11.

After the containers 16 have passed through the steam tunnels 11 and 10, respectively, they move beneath the cap feeding mechanism 17 wherein caps are automatically applied to successive jars. In order to avoid undue complications of the drawings, the actual mechanism for applying the caps to the jars has been omitted since any suitable device may be employed. By reason of this improved arrangement including the composite steam tunnel and means for heating the caps as they pass down the cap chute 17, the head spaces of the jars and the interiors of the caps are sterilized without increasing substantially the temperature of the jars and product as an entirety; hence the product may be kept at a relatively low temperature and impairment of the product avoided.

The steam tunnel section 11 shown in Figs. 3 to 7, inclusive, comprises a chamber 18 of tubular configuration having an opening 19 at the outer end thereof for reception of the steam inlet pipe 20. The chamber 18 is closed at its inner end by a wall 21 and at its outer end by the wall 22 which forms one end wall of the tunnel section 11. This end wall 22 includes an opening 23 therein aligned with the chamber 18 for insertion of heater 24 in the form of a U-shaped tube carried by a threaded plug 25 which co-operates with threads in the opening 23 to completely seal the manifold 18. Suitable electrical connections 26 and 27 are provided on the outer face of the plug 25 for connection of the heater to a suitable source of electrical energy. In this embodiment of the invention the electric wires 28 for connection with the heating element 24 enter the steam tunnel by means of the conduit 29 which extends through and is supported by the wall 22. If desired the electrical connections 26 and 27 may be protected by securing a suitable cover 30 to the wall 22 by means of screws or other suitable fastening devices.

Extending beneath the manifold 18 is a steam distributing chamber 31 of generally rectangular configuration and having an upper wall formed by the bottom of the chamber 18, a pair of side walls 32 and 33 and a bottom wall 34 having a width approximately equivalent to that of the end plate 22. The left-hand end of the chamber 31 has an enlarged section 35 formed by the walls 36, 37 and 38 for receiving suitable temperature control means 39 adapted to be inserted through and mounted in a suitable opening in the end plate 22.

Extending forwardly of the distributing chamber 31 is a second chamber 40 formed by the top wall 41 and side walls 42 and 43 (Fig. 7). This chamber communicates with the chamber 31 by means of an orifice 44 in the wall 21, and with a forward chamber 45 by means of an orifice 46 in the end wall 47 of chamber 40. The chamber 45 is generally triangular in shape and is bounded by a sloping top wall 48 and a pair of side walls 49 and 49' (Figs. 3 and 4). In order to prevent undue loss of heat from the several chambers discussed above, an outer shell 50 covers the manifold 18 and chamber 31 and 40 and is secured by suitable means to the end plate 22 and the wall 34. If desired an insulating material 51 such as glass wool or the like may be inserted between the shell 50 and the chambers encompassed thereby.

With the structure thus far described steam enters the chamber 18 through the inlet pipe 20 and is heated by the resistance element 24 under control of the thermostat 39. It then passes into the chamber 31 by means of an opening 52 where it is uniformly distributed throughout chambers 31, 40 and 45 by means of openings 44 and 46. The steam is then discharged from the chambers 31 and 40 through a plurality of apertures, 53 in the wall 34, and through aperture 46 into chamber 45.

In order to secure uniform distribution of steam about the tops of the jars 16, a fine mesh screen 54 extends beneath the chambers 31, 40 and 45 in spaced relation thereto to form a shallow chamber 55 (Figs. 4, 6, and 7). The screen 54 is in the form of a shallow U-shaped structure with the downwardly depending leg parts 54' being secured to depending flanges 34' (Fig. 6) preferably formed integrally with the plate 34 and positioned along each edge thereof. In order to facilitate removal of the screen 54 for cleaning and other purposes, it is preferably secured by means of removable plates 56 extending throughout the length of the flanges 34' and secured thereto by means of screws 57 or other suitable fastening means. Preferably, the screen 54 is free to slide endwise so that it may be removed for cleaning and replaced without removing the plates 56. As may be observed in Figs. 4, 6 and 7, the screen 54 forms a shallow tunnel encompassing the tops of the jars 16 and forms a uniform cloud of steam for sterilization of the head space in each jar. When the head 11 is used in combination with the head 10 as previously described relatively high capping speeds can be employed and at the same time effective aseptic sealing can be attained with the product in the containers at relatively low temperatures of the order of 180° F.

The forward steam tunnel section 10, contiguous with the tunnel section 11, forms both an extension of the tunnel section 11 and means for enveloping the containers in a steam cloud during and immediately after application of the caps or closure. Moreover the section 10 instead of utilizing steam alone is provided with a combination of steam and air which, as will be shown, insures accurate control of the vacuum in the head space of the sealed container.

More specifically and with reference to Figs. 1, 2, 9 and 10 the forward tunnel section 10 is in the form of an elongated casting 60 having two longitudinally disposed chambers 61 and 62 and a recess of tunnel 63 in the underside thereof. Immediately above the chambers 61 and 62 at the left end of the tunnel 10, as viewed in Figs. 9 and 10, is a shallow chamber 64 which communicates with the chambers 61 and 62 by means of openings 65 and 66. A top plate 67 seals the chamber 64 and includes provision for receipt of an inlet pipe 68. About midway of the length of the tunnel 10 the chambers 61 and 62 merge into a common chamber generally denoted by the numeral 62'. This section of the tunnel has an opening 69 in the top side thereof closed by a suitable metal plate 70, which carries a bracket member 69' for co-operating with the rod 119 fastened to the superstructure 12. The heaters 71 and 72 extend through and are supported by the end plate 73. A suitable thermostat 74 extends through the top plate 67 for controlling the operation of heaters 71 and 72.

The heating fluid such as steam or a mixture of air and steam, admitted to the chambers 61, 62 and 62' is in part discharged into the recessed portion 63 of the tunnel section by means of two sets of diagonally disposed orifices 75 and 76 and a number of vertically disposed orifices 77. The mixture thus discharged into the recess or tunnel 63 is then further dispersed by a screen 78 spaced from the wall of the recess and secured to the legs 79 of the casting 60. Since this tunnel section 10 is in effect an extension of the tunnel section 11 but individually controlled, it is possible to bring each jar rapidly to the aseptic sealing temperature and then maintain such temperature throughout the remainder of the sealing process. Moreover, as will be shown, this arrangement of elements enables the exercise of more accurate control over the vacuum desired within the sealed container without in any way interfering with the attainment of good aseptic sealing.

The forward wall 80 of the tunnel 10 is inclined at an appropriate angle to receive and align the cap or closure chute 17 as will be described. This wall is also provided with at least one orifice 81 for supplying air and steam through a series of passages 82 for discharging a stream of hot fluid from chamber 62' directly into the head space of each jar as the cap is applied.

In addition to the envelopment of the open end of the containers in a heated atmosphere prior to and during the capping operation, means are provided in the form of a pair of elongated slotted members 84 extending forwardly of the terminal end of the cap chute 17. These members are secured to the underside of the casting 60 as illustrated and each is provided with a central opening or passage 84' in communication with the chamber 62' of the tunnel 10 by means of a pair of vertically disposed openings 86. The mixture of the heated gas such as steam or a mixture of air and steam in the passages 84' is discharged inwardly through a plurality of slots 85 to maintain the jars in a cloud of vapor until effective sealing of the closure has been attained.

While the tunnel sections 10 and 11 may be supplied with any suitable heated gas to provide a sterile atmosphere for sterilizing the containers it has been found desirable to utilize steam for this purpose. The head 11 therefore may be fed with live steam which is superheated sufficiently to raise the head space of each container 16 to the desired temperature to attain aseptic sealing. While sterilization is an important aspect of the packaging of foods, it is also desirable to accurately control the vacuum in each sealed container since some foods may be packaged at a higher vacuum than others. Vacuum is controlled at least in part by the mixture of air and steam and while this may be accomplished at the sealing station, it has been found that more effective control is attained by subjecting each container to the desired mixture of air and steam for a longer period of time. Accordingly, the head 10 is preferably fed with a mixture of air and steam so that each container will be enveloped thereby during its travel through the tunnel 10 and immediately after sealing as well as having said mixture directed into the head space as the closure is applied.

The supply of a controlled mixture of air and steam to the steam tunnel 10 is accomplished by the mixing apparatus broadly denoted by the numeral 87 in Figs. 1 and 2. The live steam enters the mixing apparatus through a suitable conduit 88 and control valve 89 and passes into a separator 90 for removing moisture from the steam. The collected moisture is discharged periodically by means of the pipe 91 and valve 92. The dry steam passes downwardly through the pipe 93, pipe T 94, the U-shaped tube 95 and valve 96 to the venturi 97. The venturi is arranged to admit controlled quantities of air for mixture with the steam whereupon mixed gases pass through the conduit 68 to the inlet of tunnel 10. The volume and pressure of the steam may be controlled by the valve 89 or, if desired, the pressure of the steam just prior to its entrance into the venturi 97 may be controlled by the use of suitable control equipment coupled to the pipe-T 94 through tube 98 and responsive to modify the steam pressure entering the pipe 88 to maintain a predetermined pressure.

The venturi or air aspirator 97 (Figs. 12 and 13) comprises a generally cylindrical member 99 having a reduced section 100 and an opening 101 extending therethrough. Within this opening is a flared venturi tube 102. The right-hand end of the member 99 is provided with screw threads for the receipt of the outlet pipe 68 while the left-hand end includes internal threads 103 for the receipt of the steam nozzle 104. This nozzle includes means for the attachment of the steam inlet pipe 96' and a conical convergent exit portion 105 for discharging the steam at relatively high velocity into the venturi. It will be observed that the outer surface of the conical end portion 105 of the nozzle is spaced from the inner surface of the venturi tube 102 to provide an annular passage 106 for the admission of air through four equally spaced openings 107 extending through the narrowed section 100 of the member 99.

Surrounding the section 100 of the member 99 is a cylindrical or rotary valve member 108 having four openings 109 which in one position are in alignment with the openings 107 for the admission of air. In order to prevent dust and dirt from falling into the openings 109, a guard 110 surrounds the valve member 108 and is provided with a handle 111 for rotation of the guard 110 and valve 108. Means in the form of a ball and spring assembly 112 is provided to prevent accidental rotation of the valve 108. With this arrangement movement of the handle 111 in one direction will align the openings 107 and 109 to admit air and rotation in the other direction will move them out of register to reduce the amount of air or shut it off entirely.

In certain cases it may be desirable to permit only a portion of the steam to pass through the venturi assembly 97 in order to secure a finer control over the intake of air. For this purpose a bypass 113 is connected between the valve 96 and the pipe 68 so that the valve 96 can be adjusted to permit some of the steam to pass through the venturi and the remainder through the bypass. For clarity, the venturi system 87 is illustrated as being disposed beyond the left-hand end of the machine as illustrated in the drawings. In actual practice, however, it is positioned immediately to the left of the superstructure 12.

Both steam tunnels 10 and 11 together with the air and steam mixing apparatus 87 are preferably mounted on and entirely supported by the superstructure 12 of the apparatus. In the case of the section 11 this is accomplished by suitable bracket members 114 and 115 while in the case of the section 10 support is attained by the brackets 116 and 69'. Thus raising and lowering of the superstructure will automatically raise and lower the tunnels to accommodate jars of different heights.

Referring to Figs. 8, 14 and 16, which show the cap or closure chute 17, it will be observed that the chute is disposed at the end of the tunnel 10 and in the present embodiment is suitably affixed to the sloping forward wall 80 thereof and to the stud 119 by means of a bracket member 118. The chute assembly 17 consists generally of an elongated steam housing denoted by the numeral 117 having an inclined guideway for delivering caps to containers. The lowermost is held in position to be engaged and removed by a container passing under it. It will be observed that the several passages leading from the chamber 62' of tunnel section 11 and passing through the wall 80 thereof extend through the lower end of the housing 117 and open upon the upper surface of the lip 120. Although not shown in the drawings suitable closure applying means are disposed at this point in the apparatus and co-operates with the closure guide or chute 121 to apply the closures to the jars.

More specifically the housing 117 (Figs. 15 and 16) includes an elongated rectangular section 125 having a pair of longitudinally disposed openings 126 and 127 for the reception of electric heaters 128. Centrally of the openings 126 and 127 is a third opening 129 of somewhat shallower depth for receiving a thermostat 130 to control the operation of the heaters. At the upper end of the elongated section 125 of housing 117 is an enlarged housing part 131 including a steam chamber 132. A steam inlet conduit 123 connects with the chamber 132 which in turn is connected with the openings 126 and 127 by means of the passages 133 and 134. The steam entering these passages passes downwardly about the associated heaters and is discharged at the lower end through a pair of passageways 135 and 136 to a tubular member 137 (Fig. 14) overlying the steam housing 117 and having a plurality of perforations 138. On each side of the tube 137 and spaced outwardly therefrom are a pair of closure guides or rails 139 for transporting the closures downwardly to the closure applying station.

With the foregoing arrangement, the inside of each closure is enveloped in an atmosphere of steam that raises the temperature of the inner surface of the closure and gasket to that of the head space of the containers by the time it reaches the bottom of its travel and is ready for application. Thus the inside of the closure is sterilized to assure aseptic sealing.

In the present embodiment of the invention, the steam pipe 123 is shown as being coupled with the air and steam inlet pipe for the steam tunnel section 10, so that a mixture of air and steam may be employed for sterilizing the closures in addition to enveloping the containers as previously described. This procedure insures more accurate control of the resulting vacuum within the sealed container but steam alone may be used for sterilizing the closures, if desired.

In the normal operation of a capping machine of the character described above, the containers may travel at the rate of about 180 a minute with the containers spaced slightly from each other. Thus the sterilizing of the head space of each container must be done within a short period of time. As previously pointed out, with products such as jellies and jams, effective sterilization of the product itself is attained by cooking for a substantial period of time while head space sterilization is accomplished herein at much higher temperatures in a short period of time. With this invention good aseptic sealing may be secured, when products at the time of sealing are at temperatures of as low as 130 to 170° F., by the utilization of steam temperatures in the tunnels which will raise the temperature of the head space and the interior of the closure to 350° F. or more at the time of the sealing operation. However, it is desirable that the vacuum in the sealed jar be carefully controlled by the admixture of air and steam. To attain this end, the tunnel 11 subjects the head space of each jar to steam alone and thus partially raises the temperature thereof to the desired degree. The container then passes into head 10 which is supplied with steam and air where the head space including the surface of the product and the exposed rim and adjacent inside wall is further heated to a temperature of 350° F. or more for complete sterilization. By the mixture of air and steam the precise amount of vacuum may also be obtained. Moreover, by controlled heating of the caps or closures prior to application they are not only sterilized but also brought to substantially the same temperature as the head space.

It will be seen that by utilizing the present machine and method for aseptic sealing a packer may cook and seal his product at any desired temperature in order to obtain the best quality and color of his product. The product may be sealed while at temperatures well below the boiling point, for example 180° F., and at the same time the present machine and method will thoroughly sterilize the head space and the interior of the closure so that products such as jellies and jams will have a long shelf-life without the formation of mold on the surface of the product. The packer is not required to sterilize the product after it is sealed and thus incur the additional expense of that operation and subject his product to the deterioration and to the discoloration occasioned by further cooking. By the admixture of air with the steam in the second section of the tunnel it is possible to control accurately the resulting vacuum in the head space of the container so that the product does not boil or form bubbles after the sealing operation. By supplying the air with the steam for a substantial period prior to the sealing operation it is possible to get uniform results and to obtain very accurate and uniform control of the amount of vacuum in the head space of the sealed containers.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a machine for aseptic sealing, the combination of a conveyor for transporting containers past a sealing station, first means for directing steam into the head space of said containers for a substantial distance prior to their reaching the sealing station, second means for directing a mixture of steam and air into the head space of the container during the final portion of its movement to the sealing station, means for delivering caps to the sealing station, means for directing a mixture of steam and air into the interior of the caps for a substantial distance prior to their reaching the sealing station, means for superheating said steam and air mixture applied to said head space and to said closure to a temperature above 350° F. so that it will sterilize said head space and the interior of said closures, and means for sealing the closures on the containers while the head space is filled with the steam and air mixture.

2. In a machine for sealing containers, a conveyor for transporting said containers, and means spaced above said conveyor for discharging steam in and about the containers to be sealed during a substantial portion of their travel and a means for discharging a mixture of steam and air in and about said containers during another substantial portion of their travel.

3. In a machine for sealing containers, means for transporting said containers, tunnel means spaced above said conveyor for at least partially enveloping said containers prior to reaching a closure applying station, said means being adapted to direct steam into the head space of and about said containers during a portion of their travel therethrough and to direct a predetermined mixture of steam and air during another portion of their travel, and means for directing a mixture of steam and air directly into each container at the closure station.

4. In a machine according to claim 3 wherein said tunnel means comprises two tunnel sections including means for feeding steam into one of said sections and a mixture of air and steam into another of said sections.

5. In a machine according to claim 3 wherein means are provided for heating said closures.

6. In a sealing machine, the combination of conveyor means for moving containers through the machine, a chute for delivering successive closures to a closure applying station for application to the containers, means including a first distributing chamber for directing heated steam in and about said containers prior to their arrival at the closure applying station, a second distributing chamber for directing an air-steam mixture in and about said containers at the closure applying station, at least one nozzle communicating with said second chamber for directing a portion of said air-steam mixture into said containers at the closure station, means for discharging a portion of said air-steam mixture in and about the closures at the closure station, and means extending forwardly of the closure station and coupled with said distributing chamber for enveloping said containers in an atmosphere of said air-steam mixture during and immediately after application of the closures.

7. In a sealing machine according to claim 6 wherein said closure heating means comprises a perforated tube disposed on the underside of said chute.

8. In a sealing machine having a conveyor for the transportation of containers to be sealed, a tunnel section spaced above said conveyor comprising an elongated housing having at least one chamber therein, and means at one end of said chamber for the admission of a heated gas, means beneath said housing including depending side members extending below the tops of said containers, said housing having a plurality of orifices connecting said chamber with the last said means to envelop at least part of said containers in a heated atmosphere, a pair of spaced hollow members extending from the other end of said housing and having a plurality of openings on the inner faces thereof, said members including means communicating with said chamber, and means in the other end of said housing for supplying heated gas for injection into said containers as they pass between said spaced members.

9. In a sealing machine according to claim 8 wherein said openings in said spaced members are in the form of slots.

10. In a sealing machine for containers, means for mixing air and steam for sterilizing said containers comprising a tubular member having at least one opening in the wall thereof, a venturi tube within said member and adjoining said opening, a steam inlet including a nozzle closing one end of said member and extending beyond said opening and at least partially into said venturi tube, means surrounding said tubular member for opening and closing said opening, and outlet conduit means coupled with the other end of said tubular member.

11. In a sealing machine according to claim 10 wherein a conduit including a control valve is connected between the inlet and outlet to control the differential pressure therebetween.

12. In a sealing machine the combination of a conveyor for transporting containers past a sealing station, a plurality of means for directing steam and a steam-air mixture successively into the head space of the containers for a substantial distance prior to their reaching the sealing station, and means for independently controlling the temperature of the steam and the steam-air mixture in at least two of said plurality of means, and means for delivering closures to the sealing station.

13. A machine in accordance with claim 12 in which said plurality of means comprise detachable tunnel sections.

14. In a machine for aseptically sealing containers, means in advance of a closure applying station for heating the head space of said containers to a sterilizing temperature, means for heating the inside of the closures being applied to the containers to a sterilizing temperature, means for sealing the closures to the containers while the interior of the closures and the head space of the containers are at the sterilizing temperature, and means for maintaining a sterile atmosphere of a predetermined mixture of air and steam in and about said containers during and immediately after the application of said closures.

15. In a sealing machine having a conveyor for the transportation of containers to be sealed, a steam tunnel section spaced above said conveyor comprising an elongated steam chamber having a steam inlet on one end thereof and a steam outlet on the other end thereof, a heater within said steam chamber, at least one steam distributing chamber underlying said elongated chamber and in communication with the outlet thereof, and means beneath said distributing chamber having depending side members extending below the tops of the containers to be sealed, said distributing chamber having a plurality of orifices for uniformly discharging steam into the last said means for heating and sterilizing said containers, a thermostat for controlling the operation of said heater, and the last said means including a dispersing screen slidable into and out of operative position.

References Cited in the file of this patent

UNITED STATES PATENTS

| | | |
|---|---|---|
| 2,184,490 | Enkur et al. | Dec. 26, 1939 |
| 2,268,289 | Kronquest | Dec. 30, 1941 |
| 2,514,027 | Clifcorn et al. | July 4, 1950 |
| 2,529,199 | Stover | Nov. 7, 1950 |
| 2,575,863 | Clifcorn | Nov. 20, 1951 |
| 2,609,984 | Barnes | Sept. 9, 1952 |
| 2,620,111 | Hohl et al. | Dec. 2, 1952 |
| 2,620,112 | Hohl et al. | Dec. 2, 1952 |
| 2,628,757 | Brown et al. | Feb. 17, 1953 |